United States Patent [19]

Schnizler

[11] Patent Number: 4,592,142
[45] Date of Patent: Jun. 3, 1986

[54] GUARD DEVICE FOR HEDGING SHEARS, AND HEDGING SHEARS

[75] Inventor: Albrecht Schnizler, Nürtingen, Fed. Rep. of Germany

[73] Assignee: Metabowerke GmbH & Company, Nürtingen, Fed. Rep. of Germany

[21] Appl. No.: 739,482

[22] Filed: May 29, 1985

Related U.S. Application Data

[63] Continuation of Ser. No. 527,623, Aug. 29, 1983, abandoned.

[30] Foreign Application Priority Data

Aug. 27, 1982 [DE] Fed. Rep. of Germany ....... 3231899

[51] Int. Cl.$^4$ ............................................. B26B 19/04
[52] U.S. Cl. ........................................ 30/210; 30/216; 30/233; 30/287
[58] Field of Search ................. 30/208, 210, 216–220, 30/233, 286, 287, 282, 383; 83/790, 813

[56] References Cited

U.S. PATENT DOCUMENTS

| | | | |
|---|---|---|---|
| 1,833,246 | 11/1931 | Finocciaro | 30/216 X |
| 2,717,443 | 9/1955 | Turbett | 30/210 |
| 3,098,511 | 7/1963 | Consoletti | 30/382 |
| 4,216,382 | 8/1980 | Paule et al. | 30/216 |
| 4,297,786 | 11/1981 | Tuggle | 30/382 |

Primary Examiner—Douglas D. Watts
Attorney, Agent, or Firm—Jones, Tullar & Cooper

[57] ABSTRACT

In the following is described a guard device (11) for hedging shears, which have two cutter bars (13, 12) which are arranged parallel one above the other and are reciprocable relatively to one another, at least one of which bars is driven. To avoid the danger in the use of hedging shears (10) which might arise as the result of contact with the ground by the movable cutter bars, the leading ends of the two cutter bars (12, 13) is provided with a guard element projecting beyond it in the longitudinal direction and adapted to be fastened to a fixed structural part of the hedging shears (10).

8 Claims, 3 Drawing Figures

GUARD DEVICE FOR HEDGING SHEARS, AND HEDGING SHEARS

This is a continuation of co-pending application Ser. No. 527,623 filed on Aug. 29, 1983, now abandoned.

TECHNICAL FIELD

The present invention relates to a guard device for hedging shears having cutter bars which are arranged parallel and above one another and are relatively reciprocable, with at least one of the bars being operated, and to hedging shears equipped with the guard device.

BACKGROUND OF THE INVENTION

In the case of hedging shears as hitherto known it is difficult to cut hedges of thick growth at the part immediately above ground level, using a vertically orientated position of the cutter bar. This is relatively dangerous because of the risk that the free end or ends of the cutter bar or bars will strike the ground and as a result the user will find the machine torn out of his hands by the resultant reaction forces. If the user is not prepared to run this danger it is necessary to trim these parts of the hedge lying closely above the ground by hand.

SUMMARY OF THE INVENTION

It is an object of the present invention to provide a guard device for hedging shears which will avoid the difficulty referred to above when the shears are in use. In addition hedging shears which avoid this danger are also provided. This object is met by a guard device for hedging shears including a guard element which projects beyond the leading end of the two cutter bars in their longitudinal directions, the guard element being adopted to be fastened to a fixed component part of the hedging shears. In addition the solution of this problem lies in providing hedging shears incorporating a guard device of this kind.

Since the guard element in accordance with the invention stands out beyond the outermost operating position of the movable cutter bar it is possible to move the hedging shears directly down to ground level because any contact between the ground and the shears will take place exclusively through the fixed guard device. It is preferred to arrange the skid face of the device at a small distance from the leading end of the movable cutter bar in its foremost position so that a deep cut can be made with the shears and even the lowest stems attacked.

In accordance with a preferred embodiment of the present invention the guard cap has a bottom plate which is arranged parallel to the cutter bars, this plate being wider than the bars and having at both sides a rear flank which extends into the area of the front line of cut of the cutting edges of the leading cutting teeth of the bars. Advantageously the two rear flanks are turned back obliquely rearwards. This enables the stems, particularly those near the ground, to be drawn positively into the effective zone of the cutting teeth and onto the gaps between them. The two lateral rear flanks moreover leave the leading line of cut free, practically to the bottom of the relevant gaps between cutting teeth.

In accordance with a further embodiment of the present invention the guard element is in the form of a shoe with a curved skid face. This has the advantage that one can tilt the shears from an upright position both forwardly and to the rear without the shears having to be lifted further because of the guard element. The curved skid face thus corresponds in radius to the approximate distance from the hand grip of the hedging shears, where the swing axis of the shears is approximately located in use.

In accordance with a preferred embodiment of the present invention the guard element is preferably a cap of approximately U-shape which ensures that the movable cutter bars will also be covered from the front end, which means a further protection for the user.

Depending on whether the guard device is used with hedging shears with one or with two driven cutter bars the guard element is secured either to the fixed cutter bar or to one of the two fixed guide strips between which the cutter bars are guided.

Further details and constructions of the invention are to be found in the following description which describes and explains the invention in more detail in relation to an exemplary of embodiment illustrated in the drawing.

DETAILED DESCRIPTION

Figure 1:
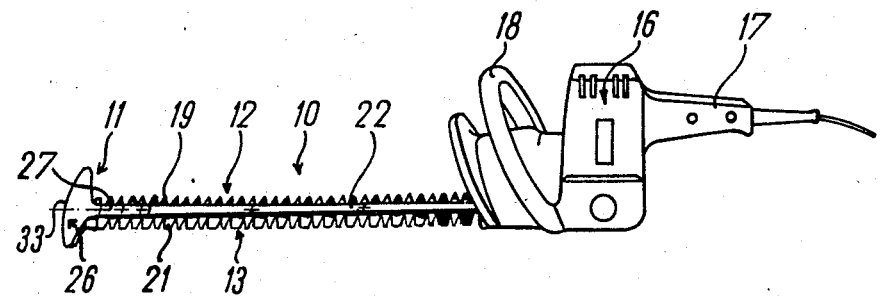
FIG. 1 is a diagrammatic perspective illustration of hedging shears provided with a guard device in accordance with the invention.
Figure 2:
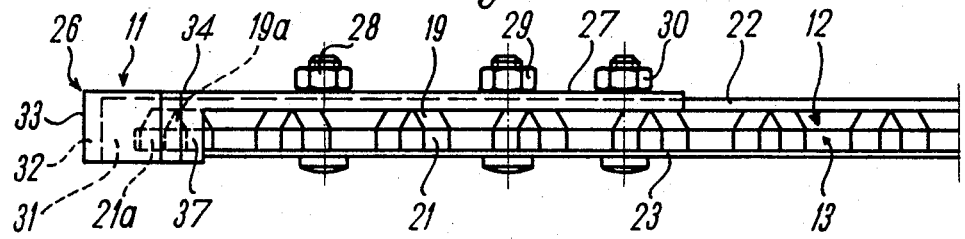
FIG. 2 is a side view on an enlarged scale of a representation of the guard device attached to the hedging shears.
Figure 3:
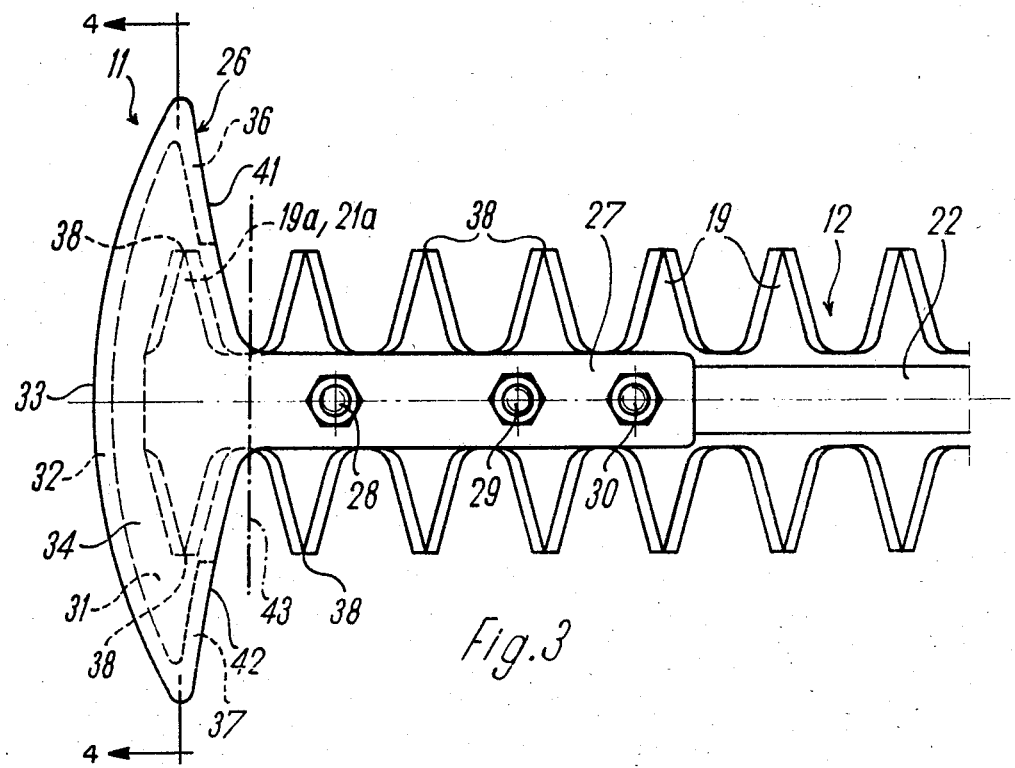
FIG. 3 is an enlarged illustration in plan of the guard device secured to the hedging shears.
Figure 4:
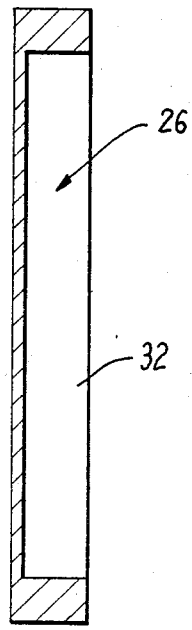

The guard device 11 in accordance with the invention attached to the leading end of a hedging shears 10 as illustrated in the drawing is used to prevent the cutter bars 12, 13 of the shears 10, or the movable cutter bar from in the case of a hedging shears with one movable and one fixed cutter bar contacting the ground during the cutting of hedges in the area closest to the ground. In addition the guard device 11 serves to pull into the cutter bar the stems of the hedge at the lower part and nearest the ground.

The hedging shears 10 illustrated in the drawing essentially comprise a casing 16 in which are installed the operating motor and the driving gear (not shown) a manual trigger grip 17 and a handle 18. Projecting from the leading end of the casing 16 are an upper and a lower cutting bar 12 and 13 respectively adapted to be reciprocated by the operating motor and the gearing relatively and opposite to one another. The two cutter bars 12, 13 which are provided with opposed cutting teeth 19 and 21 respectively are disposed directly parallel on and under one another and against one another and in their central part between the cutting teeth are embraced by strips 22, 23 which are held together by screws in such a way that the cutter bars 12, 13 are reciprocably movable. The two cutter bars 12, 13 are of the same length so that during the reciprocating motion the leading parts 19a, 21a of the bars slide past one another and beyond the free ends of the strips 22, 23 an amount depending on the prescribed stroke, which is about one half a tooth division.

In the case of a hedging shears with a movable upper and a fixed lower cutter bar the prescribed stroke in contrast is approximately one whole tooth division.

The guard device 11 of the invention which is to be secured to the leading end of the hedging shears 10 comprises a guard cap 26 in the form of a shoe integral with an attachment lug 27 which is mounted on and around the outside of one strip 22 and is secured by means of screw and nut fastenings 28 to 30 which also pass through the cutter bars 12, 13 and provide a connection with the opposite strip 23. It will be appreciated that the movable cutter bars 12, 13 are provided in the zone of the screw connections 28 to 30 with elongated holes of a length corresponding to the cutting stroke.

The same applies to a hedging shears with one driven cutter bar only, in which case the guard cap 26 can be fastened to the fixed cutter bar.

The stationary cap 26 and its attachment lug 27 are for example made of a plastics material or of light metal. As seen in cross section the guard cap 26 is of U-form and is of L-shape in longitudinal section so forming a cavity 31 which is open to the movable cutter bars 12, 13, in which cavity, during the reciprocating movement, the leading cutting teeth 19a, 21a of the movable cutter bars 12, 13 are accommodated during the stroke adjustment. The cavity 31 is bounded by a bottom plate 34 which extends parallel to the cutter bars and a front wall 32, the outside of which forms the skid face 33 of the guard cap 26. The skid face 33 is curved, preferably circular with a radius corresponding approximately to the distance between this face 33 and the handle 18 of the housing 16 which forms the swing axis of the hedging shears 10 during use of the latter. The front wall 32 and its skid face 33 are substantially wider than the two equal-width cutter bars 12, 13 including their cutting teeth 19, 21 arranged at the two sides thereof. At each of its two ends the front wall 32 merges into a rear wall 37 which in each case is set at an acute angle and terminates shortly in front of the two lateral cutting teeth 19, 21, thereby permitting the introduction of the latter into cavity 31. The rear flank faces 41, 42 of the rear walls 36, 37 are obliquely inclined towards the rear to give them a concave curvature. This ensures that when the hedging shears 10 are brought into action against hedge stems in the area close to the ground the bottom stems concerned can be drawn to the cutter bars 12, 13 and between their adjacent cutting teeth 19, 21, that is to say into the relevant tooth gaps. The rear walls 36, 37 used to draw in the stems are held back closely in front of the line 43 at which the relevant associated leading cutting teeth 19a, 21a of the two cutting blades pass and cut.

In other words the rear flanks 41, 42 meet the line of cut 43 approximately at the bottom of the tooth, at the height at which the attachment lug 27 of the guard gap 26 ends. This means that the relevant tooth gaps are left open practically up to the tooth bottom by the retracted rear and intake walls 36, 37.

By virtue of the U-shaped, fixedly-held guard cap 26 not only is any impact between the movable cutter bars 12, 13 with the ground prevented but there is also a certain amount of protection in front of the movable cutter jaw from this side and, despite this, it is assured that severed parts of the hedge will not be caught fast in the guard cap 26. It will be understood that it is also possible to make the guard cap 26 merely as a flat plate, in which event substantially only the first-mentioned advantage would be secured.

In the case of hedging shears with one driven cutter bar 12 or 13 only, in which the stroke of the bar is not equal to one half a tooth division but to one complete tooth division, the cutting line is further set back so that the guard cap may also be made longer or the run-in walls taken more closely to the back.

I claim:

1. Hedging shears, comprising:
a housing;
drive means mounted to the housing;
two cutting bars arranged parallel to each other, with at least one of said cutting bars being driven by said drive means to produce reciprocal movement between the cutting bars, and with both cutting bars being provided with opposed cutting teeth, defining cutting lines between adjacent pairs thereof, said driven cutting bar defining a leading end of the hedging shears as a function of the stroke generated by the reciprocal movement; and
a plate-like guard element connected to the housing and extending parallel to the cutting bars and outwardly of the leading end of the hedging shears, said plate-like guard element being wider than the width of the cutting bars and having at its leading end a shoe-like shaped portion with a rounded leading skid face, the guard element further having rear flank faces at the rear side of the shoe-like shaped portion, said rear flank faces extending on both sides of the cutting bars and as far as the vicinity of a cutting line, said guard element comprising a guard cap defining a cavity which accommodates the leading cutting teeth of each movable cutting bar, wherein:
one of said cutting bars is stationary; and
the guard element is fastened to said stationary cutting bar.

2. Hedging shears, comprising:
a housing;
drive means mounted to the housing;
two cutting bars arranged parallel to each other, with at least one or said cutting bars being driven by said drive means to produce reciprocal movement between the cutting bars, and with both cutting bars being provided with opposed cutting teeth, defining cutting lines between adjacent pairs thereof, said driven cutting bar defining a leading end of the hedging shears as a function of the stroke generated by the reciprocal movement;
a plate-like guard element connected to the housing and extending parallel to the cutting bars and outwardly of the leading end of the hedging shears, said plate-like guard element being wider than the width of the cutting bars and having at its leading end a shoe-like spaced portion with a rounded leading skid face, the guard element further having rear flank faces at the rear side of the shoe-like shaped portion, said rear flank faces extending on both sides of the cutting bars and as far as the vicinity of a cutting line, said guard element comprising a guard cap defining a cavity which accommodated the leading cutting teeth of each movable cutting bar; and
a fixed guide strip connected to the housing and associated with each cutting bar, wherein:
each cutting bar is driven by said drive means; and
the guard element is fastened to at least one of the guide strips.

3. The hedging shears as defined in claim 1, wherein said rear flank faces extend as far as the vicinity of the forwardmost cutting line of the cutting edges of forwardmost cutting teeth of the cutting bars.

4. The hedging shears as defined in claim 3, wherein the rear flank faces are obliquely inclined away from the leading end of the hedge shears thereby having the leading cut line free approximately to the bottom of the associated cutting teeth gap.

5. The hedging shears as defined in claim 4, wherein the rear flank faces have a concave shape.

6. The hedging shears as defined in claim 1, wherein the skid face is spaced from the leading end of the hedge shears such that a small gap exists when the leading end reaches its maximum displacement during the reciprocal movement.

7. The hedging shears as defined in claim 1, wherein the guard cap has a U-shaped cross section and an L-shape in longitudinal section with the cavity being open to the upper and lower side of the cutting bars.

8. The hedging shears as defined in claim 2, wherein the guard element includes an attachment lug extending parallel to and fastened to a guide strip.

* * * * *